United States Patent

Pankhurst et al.

[11] Patent Number: 5,938,291
[45] Date of Patent: Aug. 17, 1999

[54] WHEELS

[75] Inventors: Donald Pankhurst; Terence Roy Crowe, both of Shropshire, United Kingdom

[73] Assignee: GKN Sankey Limited, United Kingdom

[21] Appl. No.: 08/875,816

[22] PCT Filed: Jul. 5, 1996

[86] PCT No.: PCT/GB96/01613

§ 371 Date: Sep. 23, 1997

§ 102(e) Date: Sep. 23, 1997

[87] PCT Pub. No.: WO97/20704

PCT Pub. Date: Jun. 12, 1997

[30] Foreign Application Priority Data

Dec. 6, 1995 [GB] United Kingdom ............... 9524952

[51] Int. Cl.[6] .................................................. B60B 23/10
[52] U.S. Cl. ...................... 301/9.2; 301/35.62; 301/10.1
[58] Field of Search ........................... 301/9.1, 9.2, 10.1, 301/11.1, 35.62; 116/28 R

[56] References Cited

FOREIGN PATENT DOCUMENTS

| | | |
|---|---|---|
| 489615 | 1/1953 | Canada ................................. 301/9.2 |
| 025677 | 3/1981 | European Pat. Off. . |
| 319694 | 6/1989 | European Pat. Off. . |
| 348613 | 1/1990 | European Pat. Off. . |
| 405100 | 1/1991 | European Pat. Off. . |
| 2219877 | 9/1974 | France . |

Primary Examiner—Russell D. Stormer
Attorney, Agent, or Firm—Kirschstein, et al.

[57] ABSTRACT

A wheel includes a rim, and a disc by which the wheel is attached to a hub. The disc is attached to the rim by generally axially extending fasteners each of which passes through a respective opening of the disc and is received in a respective generally axially extending passage of a connection member. Tolerances in the openings of the disc and/or the passages of the connection member or members and/or the fasteners permit variation in the position of the disc relative to the rim. At least two indicators are provided, the positions of which are fixed with respect to the rim. Each indicator may be aligned with a corresponding additional opening in the disc.

15 Claims, 1 Drawing Sheet

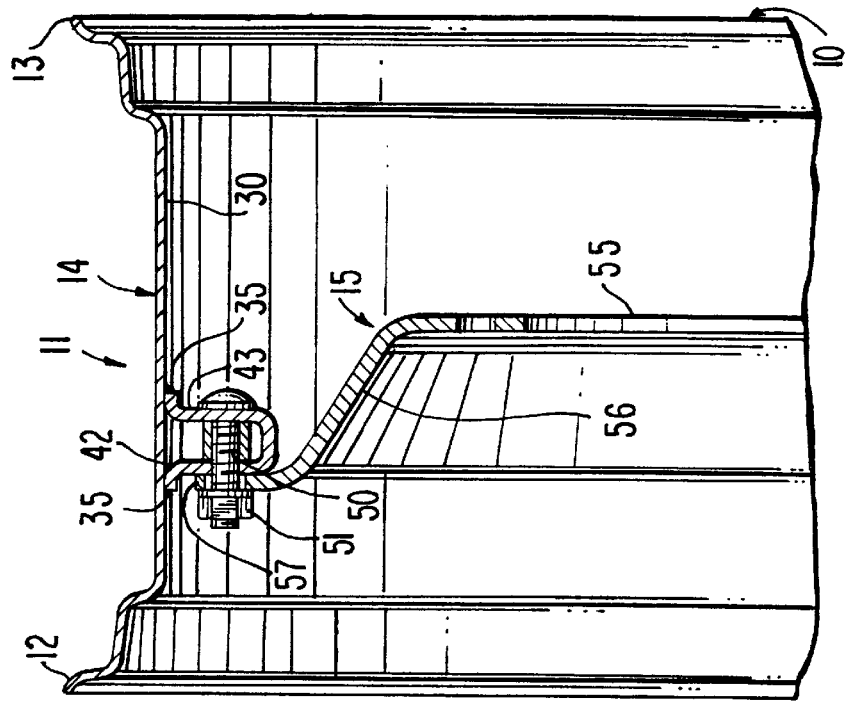
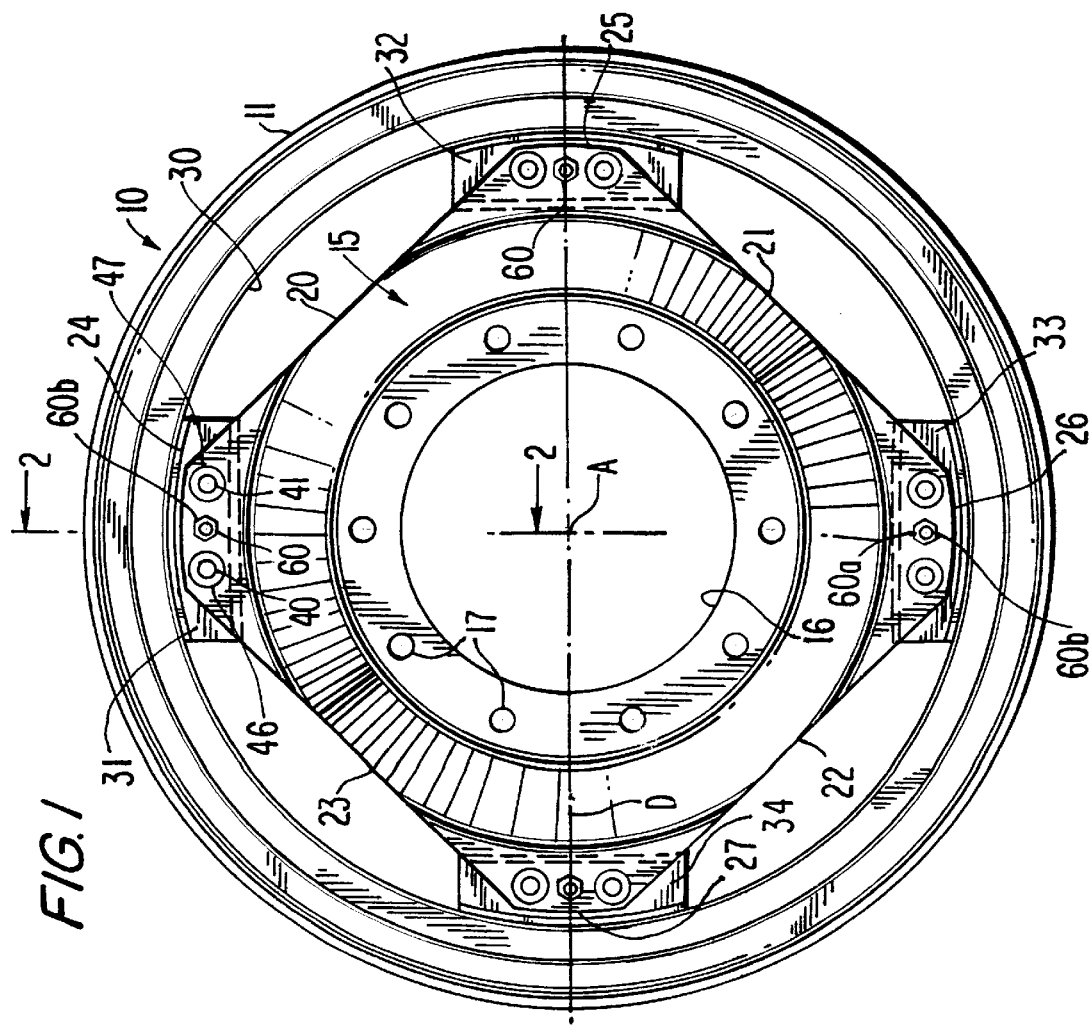

WHEELS

DESCRIPTION OF INVENTION

This invention relates to a wheel of the kind having a rim and a disc releasably attached together.

Such wheels are for example used for tractors so that the rim can be attached to disc in any one of the plurality of alternative axial positions and in any one of a plurality of alternative orientations, so that the distance between a pair of wheels on an axle can be varied to suit different agricultural applications.

It is common practice to weld to the rim around a radially inner circumferential surface thereof, a plurality of lugs, and to attach the disc to the rim by bolting through the disc and lugs.

Due to manufacturing tolerances, the actual positions of the lugs, and of passages therein to receive the bolts, cannot always be arranged to ensure that the disc is concentric to the rim and variation in the position of the disc relative to the rim may be permitted.

Whereas in the factory, using a suitable jig for example, it can be arranged for the disc and rim to be assembled such that the two are concentric or as close as possible to concentric, in the field, when often the disc is left attached to the hub of the vehicle whilst the rim is re-orientated with respect to that disc, it is very difficult to reassemble the disc and rim so that the two are concentric.

In applications where the vehicle is only arranged to travel at relatively slow speeds, e.g. 30 kilometers per hour, considerable eccentricities in the wheels can be tolerated. However, tractors are now being developed which are adapted to travel at 50 kilometers per hour and more and at such speeds, such eccentricities in the wheels can cause discomfort and instability in the tractor.

According to a first aspect of the invention vie provide a wheel comprising a rim, and a disc by which the wheel is attached to a hub, the disc being attached to the rim by means of generally axially extending fasteners each of which passes through a respective opening of the disc and is received in a respective generally axially extending passage of a connection member of the rim, tolerances in the openings of the disc, and/or the passages of the connection member and/or the fasteners permitting variation in the position of the disc relative to the rim, characterised in that at least two indicating means are provided, the positions of which are fixed with respect to the rim, and each indicating means may be aligned with a corresponding additional opening in the disc.

Thus where the rim and disc are assembled in a factory for example, so as to be concentric with one another, after the disc and rim are detached, upon reassembly, by ensuring that the additional openings of the disc and the indicating means are realigned, the disc can be reattached to the rim in exactly the same position relative to the rim so that the disc and rim are concentric.

Where it is intended that the disc can be attached to the rim in a plurality of alternative general orientations e.g. with the disc rotated about a diameter thereof by 180°, by ensuring that the additional openings in the disc and the indicating means are all equally spaced from the wheel axis, again concentricity between the disc and rim can be assured.

Also in such case, preferably one of the additional openings of the disc and the indicating means are provided in positions equally spaced from the centre of the respective passage or opening of the disc.

In one arrangement, the connection member may generally be circumferentially continuous, or a plurality of connection members may be provided, e.g. comprising lugs spaced around a radially inner circumferential surface of the rim. Particularly but not exclusively in this case, each lug may have a pair of passages each of which receives a respective fastener, and one of the additional openings of the disc and the indicating means of the lugs are preferably provided in positions equally spaced from the centres of the respective pair of passages or the respective pair of openings of the disc.

Thus in whichever permissible general orientation of attachment of the disc to the rim, by ensuring that additional openings of the disc and indicating means are aligned, concentricity of the wheel can be obtained.

In a preferred arrangement, each of the indicating means comprises an opening in the connection member or members, such that alignment of the openings in the connection member or members and additional openings of the disc, can be facilitated by the insertion of an elongate element such as a dowel or wedge pin during reassembly of the disc and rim.

According to a second aspect of the invention we provide a method of making a wheel according to the first aspect of the invention which comprises the steps of locating the disc relative to the rim in a general orientation such that the openings of the disc are each aligned with respective passages of the connection member or members, such that fasteners may be inserted through the disc and received in passages of the connection member or members, adjusting the position of the disc relative to the rim, such that the disc and rim are concentric, tightening the fasteners so as to locate and attach the disc in the rim and providing the additional openings in the disc.

Thus the additional openings in the disc, and the openings in the connection member or members too, if desired, may be made in a factory environment with the disc and rim arranged e.g. on a jig, so as to be concentric.

According to a third aspect of the invention we provide a method of reassembling a wheel made by a method according to the second aspect of the invention which comprises the steps of locating the disc relative to the rim in a general orientation such that the openings of the disc are each aligned with respective passages of the connection member or members such that fasteners may be inserted through the disc and received in passages of the connection member and members, adjusting the position of the disc relative to the rim so as to align the additional openings in the disc with the indicating means, and tightening the fasteners so as to locate and attach the disc in the rim.

It will be appreciated that tractor wheels for example, are large and that manhandling of the position of a rim relative to that of a disc can be difficult particularly where a single operator is reassembling a wheel.

Preferably the indicating means of the lugs or other connection member or members comprise openings in which case, to assist the operator, preferably an elongate element such as dowel or wedge pin is provided such that the step of adjusting the position of the disc relative to the rim so as to align the additional openings in the disc with the openings of the connection member or members can be achieved by inserting into the additional openings of the disc and the openings of the connection member or members, respective elongate elements which closely correspond in dimension to the dimensions of the additional openings of the disc, and the openings of the connection member or members.

BRIEF DESCRIPTION OF THE DRAWINGS

The invention will now be described with reference to the accompanying drawings in which:

FIG. 1 is a side view of a wheel in accordance with the invention, and

FIG. 2 is a fragmentary section on the line 2—2 of FIG. 1.

DETAILED DESCRIPTION OF THE PREFERRED EMBODIMENTS

Referring to the drawings, a wheel 10 comprises a rim 11 which comprises rim flanges 12 and 13 and a rim well 14, which are adapted to receive a tire (not shown), and a disc 15 by which the wheel 10 can be attached to a hub of a vehicle. To this end, the wheel disc 15 has a generally circular central opening 16 to receive a part of the hub, and a plurality of openings 17 by which the disc 15 and hence the wheel 10 can be bolted to the hub of the vehicle.

In this arrangement, the wheel disc 15 is generally square, with the corners of the square being truncated so as to provide a generally octagonal shape have four longer sides at 20 to 23 interleaved with four shorter sides 24 to 27.

Welded to a radially inner circumferential surface 30 of the rim 11 there are provided four spaced connection members comprising lugs 31, 32, 33 and 34, the lugs 31 to 34 extending circumferentially of the surface 30 and being welded thereto by fillet welding indicated at 35 in FIG. 2.

Each of the lugs 31 to 34 has in this example, a pair of passages 40 and 41, the passages comprising through openings in each of two limbs 42, 43 of the generally U-shaped lugs 31 to 34.

The wheel disc 15 also has adjacent each shorter side 24 to 27, a pair of openings 46, 47 which are generally aligned with the openings 40 and 41 in the respective lug 31 to 34.

Fasteners, comprising in this example bolts 50 (not shown in FIG. 1 for clarity), may pass through the passages 40, 41 of the lugs 31 to 34, and through respective openings 46, 47 of the wheel disc 15, to permit the disc 15 to be attached to the rim, by tightening nuts 51 on the bolts 50.

Because in practice the rim 11 may not be exactly round, and the positions of the lugs 31 to 34 around the radially inner surface 30 of the rim 11 may not always be arranged to ensure that the disc 15 is concentric to the rim 11, the manufacturing tolerances of the openings 46 and 47 of the wheel disc 15, at least, and also of the passages 40, 41 of the lugs 31 to 34 and of the diameters of the bolts 50 have to be such as to allow adjustment of the position of the disc 15 relative to the rim 11, prior to the nuts 51 being tightened on the bolts 50, in order to ensure alignment of the openings 46, 47 of the disc 15 and the passages 40, 41 of the lugs 31 to 34.

In this way, particularly in a factory environment e.g. by placing the rim 11 and disc 15 in a jig, it can be arranged for the wheel disc 15 to be attached concentrically to the rim 11, or within an acceptably small range of eccentricity. When assembled in this way, when the wheel 10 is attached to the hub of a vehicle, the wheel 10 will rotate generally non-eccentrically about a wheel axis indicated in FIG. 1 at A.

It will be appreciated from the drawings, that the wheel disc 15 comprises a planar part 55, a conical portion 56, and a peripheral portion 57 in which the openings 46 and 47 are provided.

The disc 15 may be attached to the rim 11 in the position shown in FIG. 2 i.e. with the peripheral region 57 to the left as seen in the drawings, of the lugs 31 to 34, or alternatively, at the right hand side of the lugs 31 to 34. In this way the position of the rim 11 can be adjusted axially on the vehicle so as to achieve different spacing between two wheels on an axle of the vehicle, e.g. to suit different agricultural and other applications.

Also, to achieve further variation in the axial position of the rim 11, if desired, the wheel disc 15 may be re-orientated by rotating through 180° about a diameter D of the disc 15 and again, the peripheral region 57 may be secured on the left or the right of the lugs 31 to 34, as seen in FIG. 2.

Thus the disc can be attached to the rim in any one of a plurality of general orientations.

To ensure that when the disc 15 and rim 11 are reassembled in the field, such that the disc 15 is again concentric to the rim 11, in accordance with the invention, in a factory environment preferably, when the disc 15 and rim 11 have been assembled on e.g. a jig so as to be concentric or closely concentric, additional openings 60, 60a are provided through the disc 15 adjacent at least two of the lugs 31 to 34, e.g. by drilling. Such additional openings 60, 60a may be provided adjacent any two of the lugs 31 to 34, through the disc 15, but preferably are provided in a pair of diametrically opposed positions. In FIG. 1, additional openings 60, 60a are shown for illustrative purposes only adjacent each of the three lugs 31 to 33, through the disc 15.

Although the additional openings 60, 60a may be made in alignment with any indicating means provided on the lugs 31 to 34, in a preferred arrangement, at the same time as making the additional openings 60, 60a in the disc 15, openings 60b are made in the respective lugs 31 to 34, of a size corresponding to the additional openings 60 of the disc 15.

To enable the orientation of wheel disc 15 in the rim 11 to be inverted, the openings 60b in the lugs 31 to 33 and the additional openings 60, 60a in the wheel disc 15 are arranged to be equally spaced from the wheel axis A. Furthermore, the openings 60b of the lugs 31 are provided equally spaced from the centres of the respective passages 40, 41 of the lugs 31 to 33.

In this way, whichever of the plurality of general orientations is selected so as to achieve a desirable axial wheel position, provided the additional openings 60, 60a, and openings 60b are aligned, the disc 15 and rim 11 will be concentric.

To facilitate man handling of the wheel and disc and to assist in achieving alignment of the additional openings 60, 60a of the disc 15 and the openings 60b in the lugs 31 and 33, preferably during reassembly, elongate elements such as dowel pins or wedge pins are inserted into the additional openings 60, 60a and the openings 60b in the lugs prior to tightening of the fasteners. Such pins can be removed once the fasteners 50, 51 are tightened, although in some circumstances, could remain in place.

In another arrangement, each of the lugs 31 to 34 may be provided with a single passage 40 to receive a fastener, and the disc 15 may also be provided with a single opening 46 in a position adjacent to a corresponding lug 31 to 34, so that a fastener 50 may be inserted through the opening 46 of the disc 15, and be received in the passage 40 of the corresponding lug 31 to 34.

The disc 15 would be provided with four additional openings 60, 60a, each equally spaced to one side of an opening 46 of the disc 15. When the disc 15 is in one orientation relative to the rim 11, a first two of the additional openings 60, 60a may each be arranged to be aligned with a respective one of two openings 60b or other indicating means of the lugs 31 to 34, which too are each located each to one side of the single passage 40 of the respective lug 31 to 34.

When the orientation of the disc 15 is reversed, the other two of the four additional openings 60, 60a may be brought into alignment with the two openings 60b of the lugs 31 to 34.

Of course, this arrangement could be reversed i.e. four openings 60b or other indicating means may be provided in the lugs 31 to 34, e.g. two in each of two lugs, and the disc may have two additional openings 60, 60a only, each located to one side of a respective opening 46 of the disc 15.

Many alternative variations of such constructions are possible as will be apparent to the man skilled in the art.

The present invention has been described with reference to a particular example in which the disc 15 is attached to the rim 11 by means of a plurality of lugs 31 to 34. In another arrangement, alternative kinds of connection members could be provided spaced around the inner circumferential surface 30 of the rim 11, in pairs, or otherwise as required.

In yet another arrangement, instead of there being a plurality of individual connection members each providing passages to receive the fasteners 50/51, in another arrangement, the wheel 10 may comprise a single connection member which extends generally continuously around the radially inner circumferential surface of the rim 11, the connection member providing a plurality of spaced openings to receive fasteners by which the disc 15 can be attached to the rim 11. The disc 15 need not be of the octagonal configuration shown in the drawings, but could be of any other desired polygonal, or even circular configuration, as desired.

Although the wheel 10 described is a tractor wheel, the invention of course may be applied to any other wheel where the disc 15 and rim 11 are in releasably attached, particularly but not exclusively to permit repeated reassembly and disassembly of the wheel whilst maintaining concentricity between the disc 15 and rim 11.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

We claim:

1. A wheel rotatable about a wheel axis, comprising:
   a) a rim;
   b) a disc for attachment to a hub of a wheeled vehicle, said disc having a disc opening extending along the axis;
   c) connecting means for connecting the disc in a generally concentric position to the rim, including a passage extending along the axis and aligned with the disc opening in said concentric position, and a fastener passing through the passage and the aligned disc opening;
   d) said disc opening, said passage and said fastener having manufacturing tolerances that permit angular variation from said concentric position; and
   e) alignment means for adjustably aligning the disc to the rim to said concentric position prior to connecting the disc to the rim, including a plurality of alignment openings extending through the disc and angularly spaced from the disc opening, and a plurality of indicating means having fixed positions on the rim and respectively alignable with the alignment openings.

2. The wheel according to claim 1, wherein the rim has an inner circumferential surface, and wherein the connecting means includes a plurality of connection members fixed to said inner circumferential surface at spaced-apart locations angularly spaced around the wheel axis.

3. The wheel according to claim 2, wherein each connection member has a U-shaped cross-section with two limbs spaced apart along the axis, and wherein the passage extends through said limbs.

4. The wheel according to claim 2, wherein the disc has another disc opening extending along the axis and spaced angularly from the first-mentioned disc opening, both disc openings constituting a pair of disc openings and extending through each connection member.

5. The wheel according to claim 4, wherein at least one of the alignment openings is located between at least one of the pairs of the disc openings.

6. The wheel according to claim 4, wherein the disc openings and the alignment openings are all equally radially spaced from the wheel axis.

7. The wheel according to claim 4, wherein the connecting means includes another passage extending along the axis, spaced angularly from the first-mentioned passage, and aligned with the other disc opening in said concentric position, and another fastener passing through the other passage and the other aligned disc opening.

8. The wheel according to claim 2, wherein each of the indicating means is an indicating opening extending along the axis through a respective connection member, wherein each indicating opening is aligned with a respective alignment opening to form an alignment passage for receiving an elongated alignment element.

9. The wheel according to claim 8, wherein the indicating opening, the alignment opening and the disc opening are all equally radially spaced from the wheel axis.

10. The wheel according to claim 3, wherein the fastener includes an elongated threaded bolt extending through both limbs, and a threaded nut engageable with the bolt and bearing against one of the limbs.

11. The wheel according to claim 1, wherein two of the alignment openings are diametrically opposite each other, and wherein two of the indicating means are indicating openings which are also diametrically opposite each other.

12. A method of mounting a wheel on a hub of a wheeled vehicle for generally concentric rotation about a wheel axis, comprising the steps of:
   a) providing a rim;
   b) providing a disc for attachment to the hub with a disc opening which extends along a wheel axis;
   c) connecting the disc in a generally concentric position to the rim by aligning the disc opening with a passage extending along the axis through the rim, and by passing a fastener through the passage and the aligned disc opening; and
   d) adjustably aligning the disc to the rim to said concentric position prior to performing the connecting step by forming a plurality of alignment openings that extend through the disc and that are angularly spaced from the disc opening, and by forming a plurality of indicators having fixed positions on the rim, and by respectively aligning the alignment openings with the indicators.

13. The method according to claim 11, wherein the connecting step is performed by fixing a plurality of connection members to an inner circumferential surface of the rim at spaced-apart locations angularly spaced around the wheel axis.

14. The method according to claim 13, wherein the step of forming the indicators is performed by forming an indicating opening through a respective connection member, each indicating opening being aligned with a respective alignment opening to form an alignment passage; and further comprising the step of inserting an elongated alignment element into the alignment passage.

15. The method according to claim 13, wherein each connection member has a pair of limbs that are axially spaced apart, and wherein the connecting step is performed by inserting a threaded bolt of the fastener through the passage, and by threadedly tightening a threaded nut on the bolt and into engagement with one of the limbs.

* * * * *